Oct. 1, 1968

W. BLOCHL 3,404,189

PREPARATION OF FLUORINATED ALKYL IODIDES BY
SELECTIVE TELOMERIZATION

Filed Nov. 4, 1966

INVENTOR
WALTER BLÖCHL
BY
Pauline Newman
Robert E. Patridge

United States Patent Office 3,404,189
Patented Oct. 1, 1968

3,404,189
PREPARATION OF FLUORINATED ALKYL IODIDES BY SELECTIVE TELOMERIZATION
Walter Blochl, Karlsruhe, Germany, assignor to FMC Corporation, New York, N.Y., a corporation of Delaware
Continuation-in-part of application Ser. No. 417,227, Dec. 9, 1964. This application Nov. 4, 1966, Ser. No. 603,072
12 Claims. (Cl. 260—653.1)

ABSTRACT OF THE DISCLOSURE

One to one addition of a fluorinated alkyl iodide to tetrafluoroethylene is effected by conducting the reaction in the gaseous state at about 240° C.–450° C. for residence periods of about 3 seconds to about 10 minutes at no greater pressure than about atmospheric.

Figure 2:
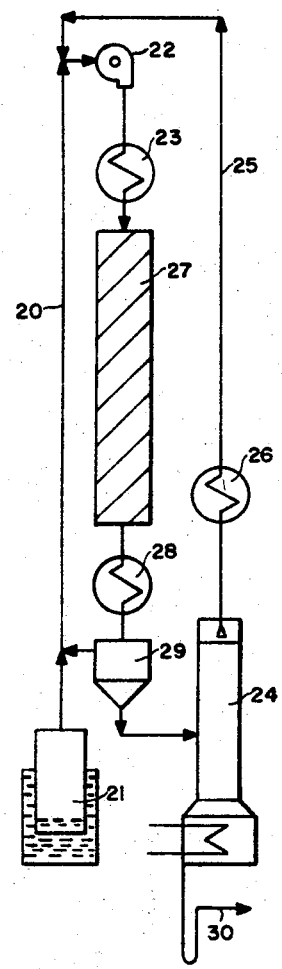
Figure 3:
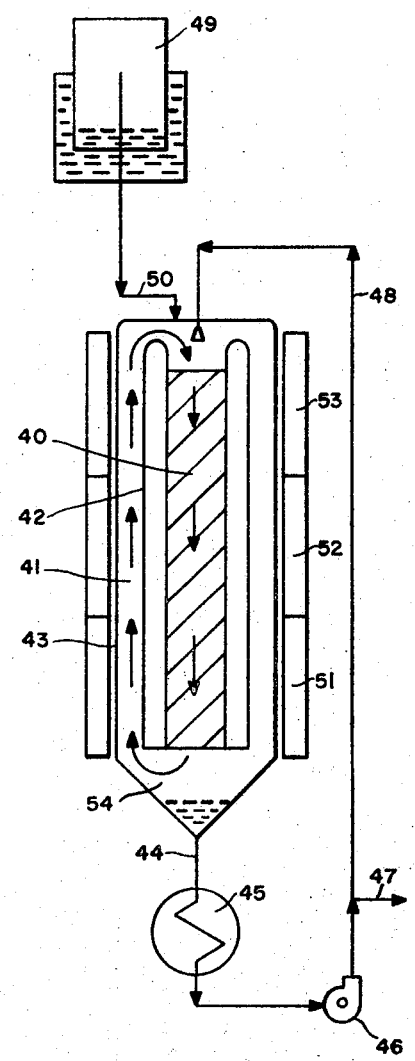

This application is a continuation-in-part of Ser. No. 417,227, filed Dec. 9, 1964, and Ser. No. 452,745 filed May 3, 1965 both of which are now abandoned.

This invention relates to improvements in the production of fluorinated alkyl iodides. More particularly, the invention pertains to a method of preparing such compounds by the controlled addition of a perfluorinated alkyl iodide to tetrafluoroethylene.

Fluorinated alkyl iodides constitute a known class of compounds which possess many useful and valuable properties. They are unusual in that a highly inert group—fluorinated alkyl—and a highly reactive group—iodide—are combined in a single molecule. As a consequence such compounds are excellent intermediates for the manufacture of a wide variety of fluorine-containing products.

Several methods of preparing fluorinated alkyl iodides are described in the technical and patent literature. The method which seems to have received the most attention and interest is based on the "telomerization" technique. In this process a lower perfluoroolefin is added to a perfluoroalkyl iodide whereby a larger perfluoroalkyl iodide is built up. In the parlance of the art the lower perfluoroalkyl reactant is referred to as a telogen whereas the perfluoroolefin reactant is referred to as a taxogen; the product of the reaction, i.e., the higher perfluoroalkyl iodide is known as a telomer. A detailed description of the telomerization reaction is set forth in Haszeldine, J. Chem. Soc., 4291 (1955).

Although generally satisfactory, the telomerization reaction suffers from the rather serious limitation of yielding a mixture of fluorinated alkyl iodides having a broad molecular weight distribution rather than a single product or a narrow distribution. This is particularly true with readily polymerizable, fluorinated olefins such as tetrafluoroethylene and chlorotrifluoroethylene, but not higher fluorinated olefins such as hexafluoropropylene.

The method described in the prior art to control the telomerization to give an essentially 1:1 addition product or a narrow range of telomers requires that the chain propagation step be terminated very early in the telomerization by favoring the chain transfer step. In this manner the formation of short chains can be enhanced. This has been accomplished by the use of either a very large excess of the telogen (5–15/1 mole basis) or a smaller amount of a telogen which is a highly efficient chain transfer agent.

Haszeldine, J. Chem. Soc., 3761 (1953), obtained a 94% yield of heptafluoroiodopropane from the UV catalyzed reaction of trifluoroiodomethane and tetrafluoroethylene by irradiating the liquid phase over a six hour period. It was necessary to use a 9 fold excess of trifluoroiodomethane and to conduct the reaction in the liquid phase. When the vapor phase was irradiated only 12% 1:1 addition occurred. 70% of the product were solid polymers with four or more tetrafluoroethylene units. When this same reaction was carried out thermally at 200° under pressure it was reported difficult to control since the reactants were mainly in the vapor phase and the large excess of trifluoroiodomethane (telogen) required to control the telomerization could not be maintained. In this case only a 23% yield of 1:1 addition product was obtained along with substantial amounts of polymer. Thus, as can be seen a large excess of the telogen is required under these conditions to obtain essentially a 1:1 addition. According to Haszeldine this is best achieved by conducting the reaction in the liquid phase (J. Chem. Soc. 1953, 3761 and 1955, 4297).

The aforediscussed methods are not practical (require the use of ultraviolet light or pressure with 5–15 molar ratio of iodide to olefin) for the economic preparation of telomers with 6–20 carbon atoms, especially 6–12.

Hauptschein is able to control the rapid telomerization of tetrafluoroethylene and chlorotrifluoroethylene by the use of efficient chain transfer agents which also serve as the telogen, U.S. Patents 3,219,712 and 3,156,732. It is claimed but not demonstrated that 1:1 addition can be obtained when the telogen is in excess of the taxogen. Effective chain transfer agents were found to be fluorinated alkyls terminated with a —$CCl_2I$ group, U.S. Patent 3,219,712, and fluorinated secondary alkyl iodides, $(R_f)_2CFI$, U.S. Patent 3,156,732. Other telogen iodides terminating in groups such as $CF_2ClCFClI$, $CFCl_2CF_2I$, $CF_2ClCF_2I$, or particularly $R_fCF_2I$ are not effective and do not control the telomerization to a narrow range nor limit it to 1:1 addition.

In order for the chain transfer agent to be effective with gaseous taxogens, the reaction must be carried out in the liquid phase (Haszeldine, J. Chem. Soc., 1953, 3761 and 1955, 4297). This requires high pressure to liquefy the taxogen, at least 100–200 lbs./in.$^2$ and preferably 200–5000 lbs./in.$^2$. The requirement for pressure severely complicates this method, for as is well known tetrafluoroethylene is a sensitive chemical entity being even more reactive at elevated pressures and may even present an explosive hazard under these conditions. Moreover, the use of pressure necessitates the need for heavy equipment in the way of reaction vessels, supply lines and the like, all of which add to the expense and complexity of an operation.

Other techniques and procedures have been suggested for obtaining a useful but wide range of telomer iodides with tetrafluoroethylene (U.S. Patents 3,132,185; 3,234,-294; 3,226,449). These methods require the use of catalysts, high pressure and incremental addition of the taxogen. In addition to the complications and hazards imposed by operating under pressure, the use of catalysts is undesirable since they complicate the isolation of the telomer product. In addition, free radical initiators or their decomposition products react with the growing telomer. Even though this reaction is slight, the effect on the stability and other properties of the telomer are pronounced. This further complicates the isolation and purification of the telomer.

It is, accordingly, a primary object of the present invention to provide a method of controlling the telomerization of readily polymerizable taxogens such as tetrafluoroethylene, chlorotrifluoroethylene and bromotrifluoroethylene which does not require a large excess of telogen or a telogen which is an efficient chain transfer agent and which method is free of the aforediscussed drawbacks. A more specific object of the invention is to provide a method for the essentially 1:1 addition of a fluoroalkyl iodide to tetrafluoroethylene such that in a stepwise manner a telomer iodide of a particular number of carbon atoms can be prepared in high yield. Other objects will become manifest subsequently.

I have discovered that the afore-enumerated objects can be realized by performing the telomerization rapidly and at moderately elevated temperatures in the gaseous phase at no greater pressure than about atmospheric pressure. In carrying out my improved telomerization reaction, I have achieved excellent results by conducting, past a heated zone, a gaseous mixture of taxogen and excess fluorinated alkyl iodide maintained at no greater pressure than about atmospheric. Optimum dwell times in the heated zone are such that at least some unreacted taxogen passes through the heated zone. Generally speaking, reaction times on the order of a few seconds to minutes are preferred while the temperature is desirably maintained in the range of from about 200° C. to about 450° C. and especially from about 300° C. to about 350° C. For optimum performance a mole ratio of telogen to tetrafluoroethylene in the neighborhood of about 2:1 to about 5:1 is preferred. If this ratio is decreased appreciably, the product distribution tends to increase. On the other hand, if the ratio is increased the production efficiency of the system is lowered because of lower conversion factors whereby the process tends to be impractical for commercial operation.

After emerging from the heated reaction zone the gaseous mixture is condensed at a cooling station after which the 1:1 addition product of taxogen and fluorinated alkyl iodide are separated from the unreacted starting telogen. There is only minor amounts of higher telomers formed.

In addition to making the 1:1 addition product, my process may also be operated to obtain higher telomers my recycling the 1:1 addition product so that it acts as the telogen in subsequent steps. Thus, by continued recycling the process can be directed to build up a telogen with any desired number of tetrafluoroethylene units, provided, of course, the reactants do not get to such a high molecular weight to be insufficiently volatile to vaporize on recycvling. In operating to produce higher telomers, it is only necessary to separate the desired molecular weight telomer from those containing one less taxogen unit and below. These lower molecular weight telomers need not be individually separated prior to recyling.

By operating in accordance with the invention a readily available molecular weight telogen such as pentafluoroethyl iodide can be added in an essentially 1:1 ratio to tetrafluoroethylene and the resulting $C_4$ telomer in turn added to a further amount of tetrafluoroethylene until a telomer of the desired general range is obtained. In other words the telomerization of reactive olefins can be controlled to give essentially a 1:1 addition and/or narrow distribution range of homologs.

My process does not necessitate the use of expensive and heavy equipment since it is conducted at about normal pressure. There is no need, therefore, for intricate or complicated control valves or heavy equipment and containers. Another advantage and benefit is the wider latitude of safety since tetrafluoroethylene, which can be explosive at high pressure, is utilized at atmospheric or even subatmospheric pressure. The previously cited Hauptschein et al. patent is typical of the high pressure telomerization reaction as currently practiced in the art. Nor does my process require a catalyst, nor does it yield polymeric by-products. These are further advantages over the known telomerization procedures.

It has already been spelled out that the residence time to effect efficient 1:1 telomer formation is on the order of a few seconds to minutes although it will be appreciated that some of the more reactive telogens may possibly require less time whereas the more sluggish members may require proportionally higher dwell. A typical relationship between residence in the reaction zone and reaction temperature is shown in the following table for perfluoroheptyl iodide and tetrafluoroethylene:

| Reaction temp., ° C. | Reaction time | | |
|---|---|---|---|
| | Maximum | Preferably less than— | Optimum |
| 230 | 1 hr | | 30 min. |
| 245 | 1 hr | 30 min | 10 min. |
| 260 | 30 min | 15 min | 3 min. |
| 280 | 30 min | 15 min | 90 sec. |
| 300 | 20 min | 15 min | 40 sec. |
| 330 | 20 min | 10 min | 20 sec. |
| 350 | 20 min | 10 min | 10 sec. |
| 330 | 20 min | 3 min | 6 sec. |
| 400 | 20 min | 3 min | 5 sec. |
| 450 | 10 min | 3 min | 3 sec. |
| 550 | 10 min | 1 min | 2 sec. |
| 700 and above | 5 min | 1 min | 0.5 sec. |

Although the process herein is conveniently carried out at about atmospheric pressure there will be instances wherein diminished pressure will be required, particularly to effect vaporization of the higher boiling telogens.

It is also important to emphasize conducting the reaction environment such that conversion of terafluoroethylene is never 100%. In other words it is desirable that at least some of the tetrafluoroethylene taxogen passes through the reaction tube unconverted. When all the tetrafluoroethylene is converted or otherwise removed from the system, formation of by-products markedly increases. This applies to $CF_2=CFCl$ and $CF_2=CFBr$ also.

The preparation of telomers by the process of the invention can be illustrated schematically by the following equation showing a 1:1 addition

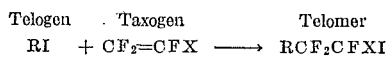

Telogen    Taxogen        Telomer
$$RI + CF_2=CFX \longrightarrow RCF_2CFXI$$

wherein R represents a fluorinated alkyl group free of branching on the $\alpha$-carbon atom and containing 1 to 28 carbon atoms and X stands for halogen such fluorine, bromine or chlorine. As used and understood herein, a fluorinated alkyl group includes a perfluoroalkyl group, a hydroperfluoroalkyl group, and a haloperfluoroalkyl group in which the halo atom can be fluorine, chlorine, bromine or iodine.

As understood in the present specification, the prefix "perfluoro" means that the compound so designated contains only carbon and fluorine. The term "bromoperfluoro" means that the compound so designated contains only carbon, fluorine and bromine. The term "chloroperfluoro" means that the compound so designated contains only carbon, fluorine and chlorine. The term "iodoperfluoro" means that the compound so designated contains only carbon, iodine and fluorine. The term "hydroperfluoro" means that the compound so designated contains only carbon, hydrogen and fluorine.

Telogens which are especially suitable for practicing the invention include the relatively accessible lower members such as trifluoromethyl iodide, pentafluoroethyl iodide, 1-chloro-2-iodotetrafluoroethane, 1,2-diiodotetrafluoroethane, while the intermediate to higher telogens are conveniently taken from the telomers produced by the telomerization herein and having the formula

$$R(CF_2CFX)_nI$$

where X and R have the values as above given and $n$ is an integer of from 1 to 13.

Examples of taxogens are tetrafluoroethylene, bromotrifluoroethylene and chlorotrifluoroethylene.

As previously pointed out the telogen must be capable of being vaporized under the reaction conditions spelled out herein and in this connection those telogens having a carbon content of 1 to 28 carbon atoms are suitable. Generally speaking, the straight chain members vaporize less readily than the more compact branched members.

In order to illustrate the invention in greater detail reference is made to the following non-limiting examples.

*Example 1.—Perfluorononyl iodide*

A gaseous mixture containing 29.1 g. of perfluoroheptyl iodide vapor and tetrafluoroethylene in a mole ratio of 3:1 was passed through a heated glass tube 1.5 m. long and 6 mm. in diameter (inside) at the rate of 0.162 g. per minute of perfluoroheptyl iodide for a period of three hours and at 80 mm. pressure. The temperature of the tube was maintained at 355° C. while the residence time amounted to 12 minutes. Prior to entering the reaction tube the gaseous mixture was preheated to 200° C. From the crude condensate there was recovered 25.65 g. of perfluoroheptyl iodide, 3.64 g. of perfluorononyl iodide and 0.52 g. of a material analyzing for about 90% perfluoroundecyl iodide. Of the 435 ml. tetrafluoroethylene in the gaseous feed, 364 mls. were recovered while 174 mls. were consumed. The conversion of the perfluoroheptyl iodide was 4.8% (3.45 g). The yield of perfluorononyl iodide amounted to 80% based on the utilized tetrafluoroethylene. 17.6% of the utilized tetrafluoroethylene was converted to 0.47 g. of perfluoroundecyl iodide, 88% and 9.75% respectively of the converted perfluoroheptyl iodide was consumed in forming 1:1 and 1:2 adducts.

*Example 2.—4-hydroperfluorobutyl iodide*

Using the general procedure of Example 1, a gaseous mixture of 2-hydroperfluoroethyl iodide and tetrafluoroethylene in a 3:1 volume ratio was passed through the reaction tube at 750 mm. pressure and 260° C. The residence time was adjusted at 3 minutes. From the condensate there was obtained 2.7 g. of 4-hydroperfluorobutyl iodide boiling at 85° C./750 mm. corresponding to a 13% conversion of the 2-hydroperfluoroethyl iodide. From a charge of 17 grams of 2-hydroperfluoroethyl iodide, 14.8 g. were recovered. From 557 mls. of tetrafluoroethylene charged, 308 mls. were recovered corresponding to a consumption of 249 mls.

The yield of 4-hydroperfluorobutyl iodide was 74% based on the tetrafluoroethylene consumed. 85% of the consumed 2-hydroperfluoroethyl iodide was transformed into the 1:1 telomer adduct.

*Example 3.—4-chloroperfluorobutyl iodide*

Using the procedure of the previous examples, a gaseous mixture of 15.0 g. of 2-chloroperfluoroethyl iodide and 425 mls. of tetrafluoroethylene were passed through the heated tube. From the condensate there was recovered 13.8 g. of 2-chloroperfluoroethyl iodide and 318 mls. of tetrafluoroethylene. There was obtained 1.5 g. of 4-chloroperfluorobutyl iodide boiling at 70° C. at 350 mm. corresponding to a yield of 86% based on the 107 mls. of consumed tetrafluoroethylene. 90% of the converted 2-chloroperfluoroethyl iodide was converted to the 1:1 adduct.

*Example 4.—4-iodoperfluorobutyl iodide*

Using the procedure of the previous examples, 20.0 g. of 2-iodoperfluoroethyl iodide vapor was passed through the reaction tube which was heated to 200° C. for a residence time of 3 minutes. Molar ratio of the telogen to the tetrafluoroethylene was 5:1. There was obtained 2.7 g. of 4-iodoperfluorobutyl iodide having a boiling point of 86° C. at 100 mm.

*Example 5.—4-bromoperfluorobutyl iodide*

A gaseous mixture consisting of 12.0 g. of 2-bromoperfluoroethyl iodide and 246 mls. of tetrafluoroethylene was passed through the reaction tube described in Example 1 at a residence time of 20 seconds. The temperature of the heated zone was 350° C. From the condensate there was isolated 34 mls. of tetrafluoro ethylene, and 2.8 g. (72% based on the tetrafluoroethylene used) of 4-bromoperfluorobutyl iodide was obtained; B.P. 130° C.

*Example 6.—Perfluorodecyl iodide*

Referring to FIGURE 2, a gaseous mixture of tetrafluoroethylene and perfluoroethyl iodide in a volume ratio of 4.2:1 is introduced into line 20 from gasometer 21. The reaction mixture is circulated by means of pump 22 with an output of about 300 liters per hour. In heater 23 the stream of gas, together with the lower homologs which are separated from the main product in rectification column 24 and which are withdrawn via line 25 as vapor from dephlegmator 26, is heated to temperatures between 330 and 350° C. The gas mixture heated in this manner is passed through packed column 27 which has a diameter of 60 mm. and a length of 2 m. and is filled with glass Raschig rings measuring 6 x 6 mm. Heating bands are provided in order to keep the wall temperature of the column at 340° C. The reaction mixture is withdrawn at the bottom end of the column and then passed through cooler 28 having a temperature of 20 to 30° C., which condenses a part of the reaction mixture. The gaseous portion from separator 30 remains in the cycle. The condensate is continuously freed of 1-iodoperfluorodecane in rectifying column 24 and then returned to the cycle via line 25. 1-iodoperfluorodecane containing only a few percent of higher homologs is removed via supply line 30. The yield is approximately 80–90% of which 80% is perfluorodecyl iodide and 15% is perfluorododecyl iodide.

*Example 7.—Chloroperfluorononyl iodide*

The procedure of Example 1 is repeated excepting the tetrafluoroethylene is replaced with an equivalent amount of chlorotrifluoroethyene.

What is claimed is:

1. A method of preparing a fluorinated alkyl iodide telomer of the formula:

$$RCF_2CF_2I$$

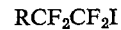

wherein R is a fluorinated alkyl group free of branching on the α-carbon and selected from the group consisting of a perfluoroalkyl group, a hydroperfluoroalkyl group, a chloroperfluoroalkyl group, a bromoperfluoroalkyl group, and an iodoperfluoroalkyl group, which comprises heating at a pressure no greater than about atmospheric, at a temperature between about 240° C. and about 450° C. and for a reaction time of from about 3 seconds to about 10 minutes, a gaseous mixture consisting of tetrafluoroethylene and at least one mole excess of a telogen having the Formula RI where R has the values as above assigned, under such conditions that at least some of the taxogen remains unconverted and the telogen and telomer are in the vapor state.

2. The method of claim 1 wherein the gaseous mixture is heated between about 300° C. and about 350° C.

3. The method of claim 1 wherein the pressure is in the neighborhood of atmospheric pressure.

4. The method of claim 1 wherein the pressure is subatmospheric.

5. The method of claim 1 wherein the telogen is pentafluoroethyl iodide.

6. The method of claim 1 wherein the telogen is perfluoroheptyl iodide.

7. The method of claim 1 wherein the telogen is 4-hydroperfluorobutyl iodide.

8. The method of claim 1 wherein the telogen is 2-chloroperfluoroethyl iodide.

9. The method of claim 1 wherein the telogen is 2-iodoperfluoroethyl iodide.

10. The method of claim 1 wherein the telogen is 2-bromoperfluoroethyl iodide.

11. The method according to claim 1 wherein the desired telomer product is continually removed from the reaction mixture and the lower telomers are recycled.

12. The method according to claim 1 wherein the telomer product is isolated from the reaction mixture.

References Cited

UNITED STATES PATENTS 2,766,299  10/1956  Schaff.
3,083,238  3/1963  Hauptschein et al.

DANIEL D. HORWITZ, *Primary Examiner.*